United States Patent [19]
Laitner, Jr.

[11] B 3,981,600
[45] Sept. 21, 1976

[54] KEY RETAINING DEVICE

[75] Inventor: Charles F. A. Laitner, Jr., Peoria, Ill.

[73] Assignee: Caterpillar Tractor Co., Peoria, Ill.

[22] Filed: Jan. 13, 1975

[21] Appl. No.: 540,632

[44] Published under the second Trial Voluntary Protest Program on January 13, 1976 as document No. B 540,632.

[52] U.S. Cl. ............................... 403/318; 403/356
[51] Int. Cl.² ........................................... F16B 3/00
[58] Field of Search ........... 403/318, 356, 358, 355, 403/344, 373, 319, 317

[56] References Cited
UNITED STATES PATENTS

| | | | |
|---|---|---|---|
| 164,609 | 6/1875 | Thomas | 403/318 |
| 368,744 | 8/1887 | Woodruff | 403/358 |
| 476,911 | 6/1892 | Westwood | 403/358 |
| 661,079 | 11/1900 | Rohrbeck | 403/344 X |
| 3,009,719 | 11/1961 | Otto et al. | 403/252 |
| 3,376,064 | 4/1968 | Jackson | 297/391 |

*Primary Examiner*—Andrew V. Kundrat
*Attorney, Agent, or Firm*—Charles E. Lanchantin, Jr.

[57] ABSTRACT

A key retaining device includes an elongated cylindrical shaft with a notch formed therein, a tubular member journalled on the shaft and having a slot formed therethrough which is aligned with the notch, a key insertable in the notch and slot for providing a torque transmitting couple between the shaft and the tubular member, and a key retaining mechanism anchorably secured to the tubular member for holding the key in its locked condition and for transferring force across the slot in the tubular member upon the transmittal of torque between the shaft and tubular member.

3 Claims, 3 Drawing Figures

KEY RETAINING DEVICE

BACKGROUND OF THE INVENTION

Various key retaining devices are known in the art for transmitting torque between a cylindrical shaft and an encircling member journalled thereon. Such coupling devices not only prevent relative rotation between the members, but also serve to maintain their relative axial positions. Most often these key retaining devices are disposed at one end of the shaft in order to permit easier removal and serviceability of the encircling member. However, design problems become apparent with many of these devices when the ends of the shaft are relatively inaccessible. For example, it is often not practical or even possible to machine elongated key slots in either the shaft or the surrounding member to be coupled to it. These elongated slots would not only be expensive to produce, but would appreciably reduce the structural integrity of the members. In addition, these elongated slots are totally unacceptable in those instances where the shaft is rotatably supported on bearings at its opposite extremities.

The use of tapered pins, set screws, and Woodruff keys represent other solutions for coupling a tubular member to a shaft. However, these solutions suffer the frequent disadvantage that the key members could vibrate out with use unless a key retaining system is incorporated therewith.

Further, these key members normally require an opening in the tubular member which serves as a stress riser therein so that the tubular member must be increased in thickness at increased expense in order to resist the forces tending to spread the opening apart.

SUMMARY AND OBJECTS OF THE INVENTION

Accordingly, it is an object of the present invention to provide a key retaining device better able to positively couple a tubular member to a shaft at a location relatively remote from the ends thereof.

Another object is to provide such an improved key retaining device which is not only economical in construction, but is also easily assembled and/or disassembled for servicing of the members.

Another object is to provide a key retaining device of the character described which is capable of transferring force across an opening in the tubular member for improved structural integrity of the coupling during its torquetransmitting mode of operation.

Other objects of this invention will become apparent from the following description and accompanying drawings.

DESCRIPTION OF THE PREFERRED EMBODIMENT

Figure 1:
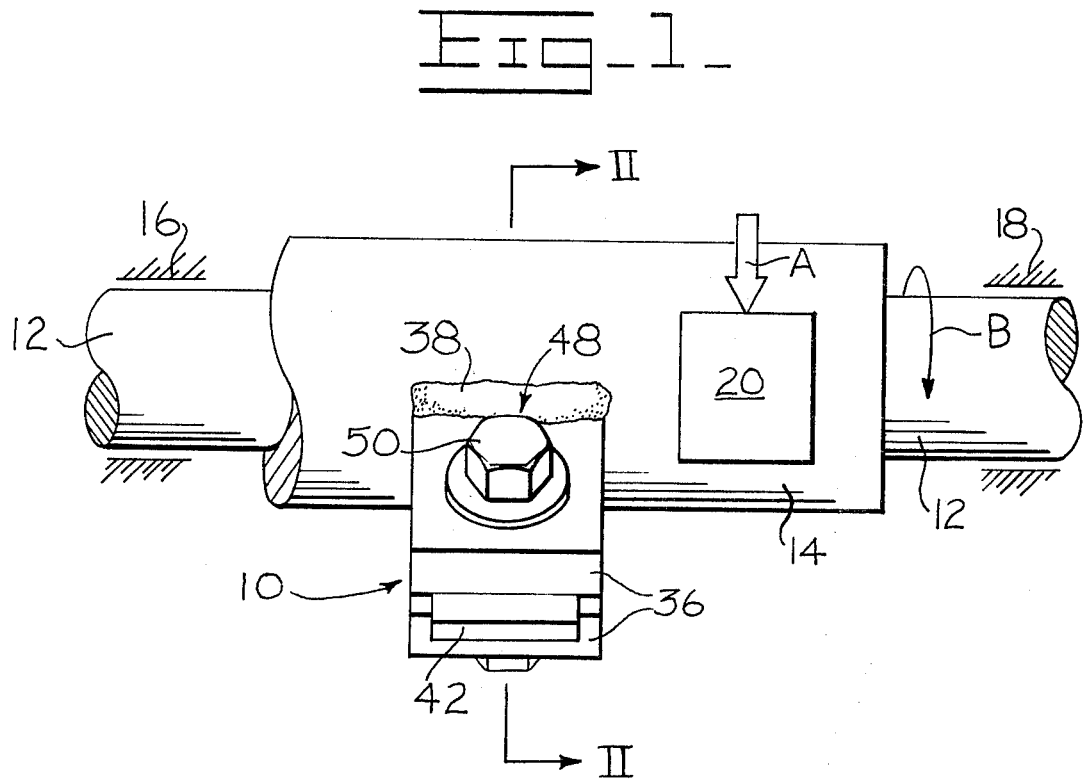
FIG. 1 is a fragmentary front elevational view of the key retaining device of the present invention.

With reference to the drawings, a key retaining device 10 embodying the principles of the present invention provides a torque transmitting couple between an elongated cylindrical shaft 12 and a tubular member 14 journalled thereon. The shaft is bridgingly and freely pivotally supported in a fixed pair of laterally spaced bearings 16 and 18 which are schematically illustrated for illustrative convenience. In this way an external force shown by the arrow identified by the letter A can be directed against a lug 20 integral with the tubular member to rotate the shaft in the direction shown by the arrow identified by the letter B. Such relationship is particularly useful in a vehicle brake pedal arrangement or the like.

Figures 2, 3:
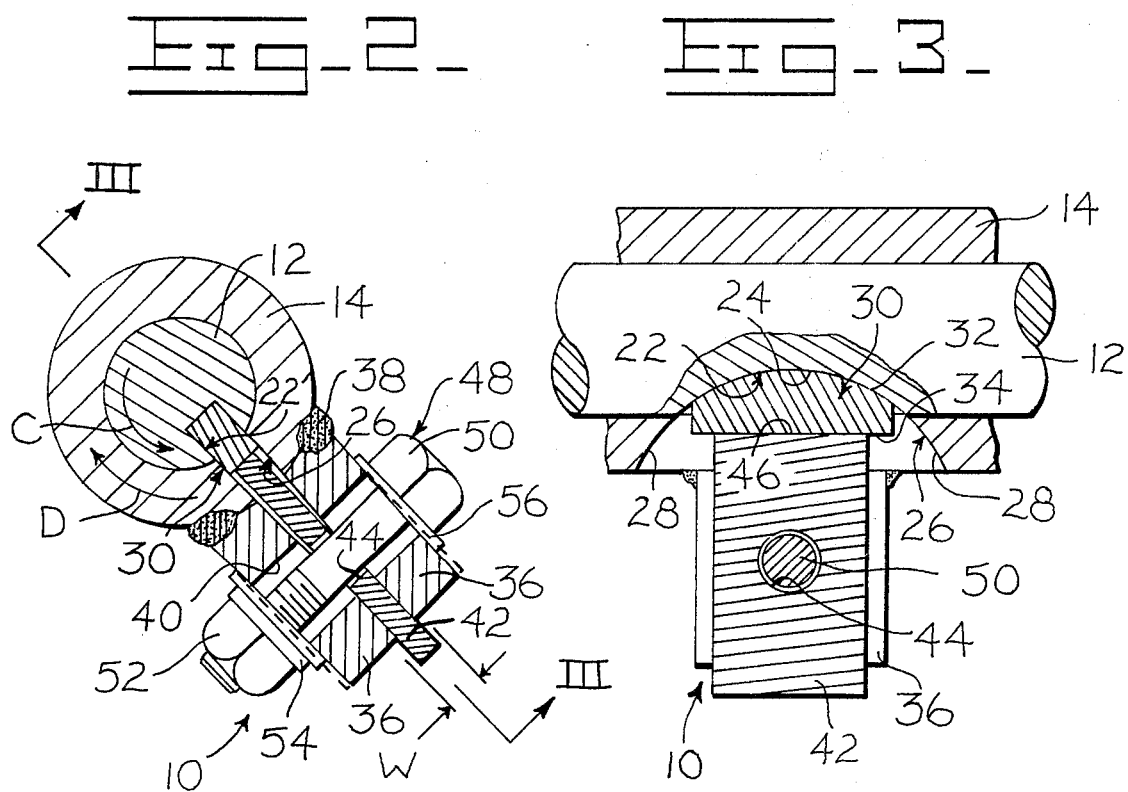
FIG. 2 is a transverse sectional view of the key retaining device of the present invention taken along the line II—II of FIG. 1.
FIG. 3 is a longitudinal sectional view of the key retaining device of the present invention taken along the line III—III of FIG. 2.

As best shown in FIG. 3, the key retaining device 10 of the present invention includes an arcuate notch 22 machined centrally in the cylindrical shaft 12 by a cylindrical cutter or the like, and thereby providing a portion of a cylinder wall 24 therein. An elongated slot 26 is similarly milled or otherwise formed in the tubular member 14 in such a manner that a pair of longitudinally spaced arcuate end walls 28 are provided therein. Upon axially and radially aligning the elongated slot and arcuate notch, a Woodruff key 30 is inserted therein. The key includes an arcuate nose portion 32 which is centrally seated abuttingly against the wall 24 so that a longitudinally extending flat portion 34 thereof is disposed radially outwardly of the shaft. Thus, the key serves to axially couple the shaft and tubular member together and to transmit torque therebetween.

More specifically, the key retaining device 10 includes a parallel pair of substantially radially outwardly extending ears 36 which are secured by longitudinal welds 38 to the tubular member 14 on opposite sides of the elongated slot 26, as best shown in FIG. 2. Each ear has a generous bore 40 therethrough, and a key retaining plate 42 is inserted radially inwardly between the ears in such a manner that an aperture 44 therethrough is aligned with the bores. A radially inwardly facing flat end surface 46 of the retaining plate is disposed in abutting engagement with the outer flat portion 34 of the Woodruff key 30 as shown in FIG. 3.

As best shown in FIG. 2 the ears 36 of the key retaining device 10 are deflectable from a parallel position as shown in broken lines to an outwardly converging position in order to clamp against the key retaining plate 42 under the loading of a threaded fastening apparatus 48. Such fastening apparatus includes a threaded bolt 50, loosely inserted through the bores 40 of the ears and the aperture 44 of the retaining plate, and a nut 52 screw threadably installed thereon. A lock washer 54, and a pair of opposite bore-bridging flat washers 56 are operatively associated with the bolt and nut to more positively clamp the ears therebetween.

OPERATION

While the operation of the present invention is believed clearly apparent from the foregoing description, further amplification will subsequently be made in the following brief summary of such operation. Upon axially and radially aligning the cylindrical shaft 12 and tubular member 14, so that the cylinder wall 24 of the arcuate notch 22 and the end walls 28 of the slot 26 are in substantial smooth, continuous arcuate alignment, the Woodruff key 30 is radially inserted therein. The key width is slightly less than the designated width W shown in FIG. 2 and defined by the distance between the ears 36 in their parallel undeflected condition, and by the substantially corresponding width of the slot and notch, for presenting a relatively tight, but free sliding relation therebetween. Substantially simultaneously therewith, the key retaining plate 42 is inserted radially inwardly between the ears so that the flat end surface 46 thereof is disposed abuttingly against the outer flat portion 34 of the key to conveniently assure positive seating engagement of the arcuate nose portion 32 and the wall 24 of the notch 22.

The relatively generous diameters of the aperture 44 in the key retaining plate 42 and the bores 40 of the ears 36 makes it a relatively simple matter to align them for insertion of the threaded bolt 50 therethrough. With the bridging flat washers 56, the lockwasher 54 and the nut 52 loosely installed on the bolt, the further screw threaded engagement of the nut thereon progressively clamps the ears together. The relatively free initial clearance between the ears and the retaining plate subsequently diminishes with increased tightening of the fastening apparatus 48. In this way the ears are biasably deflected toward one another radially outwardly of the welds 38 to bear against and positively retain the retaining plate. Thus, it may be appreciated that the key retaining device of the present invention assures positive retention of the key 30 in a relatively economical and serviceable manner.

In contrast to prior art key retaining devices, the fully loaded fastening apparatus 48 of the present invention cooperates with the ears 36 and key retaining plate 42 to transfer force transversely across the elongated slot 26. For example, if the tubular member 14 and the shaft 12 transmit torque in opposite directions as shown by the arrows identified by the letters C and D in FIG. 2, then the load through the key 30 coupling them together would tend to spread the slot 26 of the tubular member. However, this force is opposed by the slot-bridging action of the key retaining device 10 wherein the loaded bolt 50 and nut 52 effectively urge the ears and, hence, the tubular member 14 together at the welds 38. Because of this the key retaining device of the present invention can transmit relatively significant forces therethrough in either direction of relative rotation.

In addition, the key retaining device 10 is advantageously disposed in a conveniently servicably accessible, but relatively inverted condition so that moisture and dirt collection therein will be minimized. Immobilization of the key 30 through rusting or the like is subsequently substantially avoided, and upon removal of the fastening apparatus 48 and key retaining plate 42 the key can be easily removed arcuately slidably along the aligned walls 24 and 28 of the notch and slot respectively.

While the invention has been described and shown with particular reference to a preferred embodiment, it is apparent that variations might be possible that would fall within the scope of the present invention, which is not intended to be limited except as defined in the following claims.

What is claimed is:

1. A key retaining device comprising,
   an elongated shaft with a notch formed therein,
   a tubular member fully encirclingly journalled on said shaft and having a radial slot extending through the outer periphery thereof with closing end walls formed therethrough alignable with said notch,
   a pair of ears secured to the outer periphery of said tubular member in radially outwardly extending relation on opposite sides of said slot,
   a key insertable in said notch and in said slot to lock said shaft and said tubular member together,
   a key retaining plate radially inwardly disposable against said key, and
   fastener means operatively associated with said ears to deflectably bias them together for clamping the key retaining plate therebetween, maintaining said key in its locked condition and for transferring force across said slot in said tubular member.

2. The key retaining device of claim 1 wherein said pair of ears and said key retaining plate have alignable bores therethrough and said fastener means includes a threaded bolt insertable through said bores and adapted to screw threadably receive a nut thereon so that force may be transferred across said ears and through said bolt.

3. A key retaining device comprising,
   a cylindrical shaft with an arcuate notch formed therein,
   a tubular member journalled on said shaft and having a slot with arcuate end walls formed therethrough radially alignable with said notch to present a smooth continuous surface,
   a woodruff key conveniently accessibly installed or removed arcuately slidably along said surface to couple said shaft and said tubular member together,
   a key retaining plate positionable radially inwardly abuttingly against said key for preventing its movement from its normally coupled condition, and
   clamping means secured to said tubular member on opposite sides of said slot for tightly holding said plate in such key retaining position and for transferring force across said slot upon the transmission of torque in either direction between said shaft and tubular member through said key.

* * * * *